US005863660A

United States Patent [19]

Kumagai et al.

[11] Patent Number: 5,863,660

[45] Date of Patent: Jan. 26, 1999

[54] FIXING MEMBER AND FIXING APPARATUS INCLUDING SAME

[75] Inventors: Hiroaki Kumagai; Kazuo Kishino, both of Kawasaki; Masaaki Takahashi, Asaka; Hideo Kawamoto, Kawasaki; Hideyuki Hatakeyama, Yokohama, all of Japan

[73] Assignee: Canon Kabushiki Kaisha, Tokyo, Japan

[21] Appl. No.: 960,116

[22] Filed: Oct. 27, 1997

Related U.S. Application Data

[63] Continuation of Ser. No. 674,188, Jul. 1, 1996, abandoned.

[30] Foreign Application Priority Data

Jul. 5, 1995 [JP] Japan .................................... 7-169664

[51] Int. Cl.[6] ........................................................ B32B 9/04

[52] U.S. Cl. .......................... 428/446; 428/447; 428/458; 428/698; 492/46; 492/53; 492/54; 492/56; 399/331; 399/333

[58] Field of Search .................................... 428/446, 447, 428/458, 698; 492/53, 54, 56, 46; 399/331, 333

[56] References Cited

U.S. PATENT DOCUMENTS 4,329,565 5/1982 Namiki et al. .......................... 219/216
5,319,427 6/1994 Sakurai et al. .......................... 355/285
5,420,679 5/1995 Goto et al. .............................. 355/285

FOREIGN PATENT DOCUMENTS 206177 12/1986 European Pat. Off. .
312468 4/1989 European Pat. Off. .
60-225869 11/1985 Japan .
61-230180 10/1986 Japan .
62-256863 11/1987 Japan .
64-17080 1/1989 Japan .
6-19352 1/1994 Japan .

*Primary Examiner*—Mark Chapman
*Attorney, Agent, or Firm*—Fitzpatrick, Cella, Harper & Scinto

[57] ABSTRACT

A fixing member suitable for use in an electrophotographic image forming apparatus is formed by providing a silicone rubber surface layer containing a metal compound represented by $M_mX_n$, wherein M denotes a metal cation selected from Al, Sc, Cr, Fe, Co, Ni, Cu, Zn and Ga, X denotes an anion selected from halogens, inorganic acid ions and organic acid ions, and m and n are positive integers satisfying m×(valence of M)=n×(valence of X). The silicone rubber surface layer can exhibit improved wear resistance while retaining a good toner releasability.

9 Claims, 1 Drawing Sheet

FIXING MEMBER AND FIXING APPARATUS INCLUDING SAME

This application is a continuation of application Ser. No. 08/674,188, filed Jul. 1, 1996, now abandoned.

FIELD OF THE INVENTION AND RELATED ART

The present invention relates to a silicone rubber-based fixing member, particularly a silicone rubber-based fixing member and a fixing apparatus including the fixing member for use in an electrophotographic image forming apparatus.

As an elastic member used in a fixing step for electrophotographic image forming apparatus, one comprising silicone rubber has been frequently used because of its heat resistance, wear resistance, little liability of toner attachment and softness.

Along with further developments of electrophotographic image forming apparatus, such as higher speed, higher image quality and color image formation, a silicone rubber-based fixing member used in a fixing step for electrophotography is required to exhibit further improved heat resistance, wear resistance and toner releasability.

In order to comply with such requirements, it has been proposed to include a metal oxide, such as silica gel to provide an improved wear resistance (Japanese Laid-Open Patent Application (JP-A) 6-19352), but a silicone rubber-based fixing member having sufficient strength and toner releasability has not been obtained.

SUMMARY OF THE INVENTION

Accordingly, an object of the present invention is to provide a silicone rubber-based fixing member having a wear-resistance and a sufficient mechanical strength which is free from lowering at a high temperature.

A further object of the present invention is to provide a fixing apparatus including such a silicone rubber-based fixing member.

According to the present invention, there is provided a fixing member having a surface layer comprising a silicone rubber layer containing a metal compound represented by $M_mX_n$, wherein M denotes a metal cation selected from Al, Sc, Cr, Fe, Co, Ni, Cu, Zn and Ga, X denotes an anion selected from halogens, inorganic acid ions and organic acid ions, and m and n are positive integers satisfying m×(valence of M)=n×(valence of X).

In the present invention, by using a silicone rubber containing the above-mentioned metal compound, it has become possible to provide a silicone rubber-based fixing member having a sufficient mechanical strength free from a lowering at high temperatures.

These and other objects, features and advantages of the present invention will become more apparent upon a consideration of the following description of the preferred embodiments of the present invention taken in conjunction with the accompanying drawing.

DESCRIPTION OF THE PREFERRED EMBODIMENTS

Figure 1:
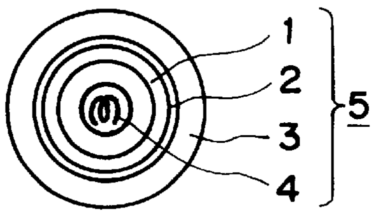
FIG. 1 is a schematic sectional view of a silicone rubber-based fixing roller according to the present invention.

The metal compound $M_mX_n$ contained in the silicone rubber layer according to the present invention has a metal element M selected from Sc (scandium), Cr (chromium), Fe (iron), Co (cobalt), Ni (nickel), Cu (copper) an Zn (zinc) among the first long-form period elements (first series transition elements), and Al (aluminum) and Ga (gallium) among the third group elements. These metals may form organic acid salts, such as octylates and naphthenates; and inorganic acid salts, such as halides, sulfates and nitrates. These metal compounds may also have a hydrate structure, or a complex structure in which a metal compound is coordinated with a liquid comprising an aryl group-containing compound, a carbonyl group-containing compound, an alkenyl group-containing compound, etc.

Among the above, it is preferred to use a metal organic salt or a metal inorganic salt which is in the form of a powder allowing an easy dispersion in a silicone rubber compound or composition before curing or can be dissolved or dispersed in a medium such as an organic solvent or water to form a solution or dispersion liquid which can be blended with a silicone rubber compound before curing, followed by removal of the medium, to be uniformly dispersed in the resultant silicone rubber.

The metal compound may preferably be incorporated in such an amount as to provide a silicone-rubber formed product constituting a fixing member with improved heat resistance and wear resistance without causing degradation with time of the resultant silicone rubber, more specifically 3–300 ppm, more suitably 5–200 ppm, of metal element in the metal compound with respect to the silicone rubber. In order to provide good toner releasability or cleaning performance, it is preferred to use a silicone rubber comprising polymerized units of a high-molecular weight, i.e., a high-viscosity, linear polysiloxane. More specifically, it is preferred to use a silicone rubber comprising at least 20 wt. % of polymerized units of a linear polysiloxane having a vinyl group at both terminals and having a viscosity at 25° C. of at least 400 Pa·s, more preferably at least 500 Pa·s. Examples thereof may include polydialkylsiloxanes, polydiarylsiloxanes and polyalkylarylsiloxanes each having a vinyl group at both terminals. These siloxanes may be used singly or in combination of two or more species.

Representative examples may include: polydimethylsiloxane for the polydialkylsiloxanes; polydiphenylsiloxane for the polydiarylsiloxanes; and polymethylphenylsiloxane for the polyalkylarylsiloxanes.

Another compound may optionally be used for polymerization together with the high-viscosity linear polysiloxane having a vinyl group at both ends to provide the silicone rubber. Examples of such another component may include branched organopolysiloxanes and linear organopolysiloxanes having two or more vinyl groups in their molecule of preferably a low viscosity type having a viscosity at 25° C. of 100 Pa·s.

The silicone rubber constituting the surface layer of the fixing member may be formed by polymerization accompanied with crosslinking of such a polyorganosiloxane in the presence of a peroxide or platinum catalyst.

In the present invention, it is particularly preferred to use a platinum-catalyzed addition-type crosslinked silicone rubber which shows better toner releasability but lower heat resistance than a silicone rubber formed by crosslinking with a peroxide and blend therewith the metal compound before the molding thereby providing improved heat resistance, and wear resistance (strength) without impairing the toner releasability.

The silicone rubber-based fixing member according to the present invention may be used as a fixing member showing excellent heat-resistance, toner releasability, durability, etc. The silicone rubber-based fixing member is constituted to have an outermost layer comprising a molded or formed product of such a silicone rubber composition or compound containing the metal compound. For example, the silicone rubber-based fixing member may be embodied as a single layer roller comprising a hollow aluminum cylinder substrated coated with a molded silicone rubber layer; a two-layer roller comprising aluminum cylinder substrate coated with a lower layer of another rubber and a molded silicone rubber surface layer; or a three-layer roller formed by inserting a coating oil-barrier layer (of, e.g., fluorine-containing silicone rubber) between the lower and the surface layer of the two-layer roller.

The thus-constituted silicone rubber fixing member according to the present invention may have excellent heat resistance and wear resistance required for high-speed fixing in electrophotographic image forming apparatus, and exhibit less toner attachment. Thus, the silicone rubber fixing member may be embodied, e.g., as a fixing roller, an oil application roller or a pressing roller for two-side fixation.

FIG. 1 is a schematic sectional view of a fixing roller as an embodiment of the fixing member according to the present invention. Referring to FIG. 1, the fixing roller comprises a hollow aluminum cylinder 1 containing therein a halogen lamp heater 4, and a silicone rubber layer 3 containing a metal compound $M_mX_n$ coated on the cylinder 1 with an adhesive layer 2 disposed therebetween.

The fixing roller may be combined with a mating pressing member, such as a pressing roller to provide a fixing apparatus. More specifically, a recording material, such as paper or transparent sheet, carrying a yet un-fixed toner image thereon is nipped by and conveyed between the fixing roller and the pressing member to heat the toner image at the nip to fix the toner image onto the recording material.

Hereinbelow, the present invention will be described based on Examples and Comparative Examples.

EXAMPLE 1

A heat-fixing roller having a structure as shown in FIG. 1 as an embodiment of the fixing member according to the present invention was prepared in the following manner.

Referring to FIG. 1, an aluminum cylinder 1 having an outer diameter of 58 mm was coated with an adhesive layer 2 (of siloxane-type primer, "DY39–051" (trade name), mfd. by Toray Dow Corning K.K.), followed by heat-drying at 200° C.

Separately, a silicone rubber composition containing 40 wt. % of a linear polydimethylsiloxane terminated with a vinyl group at both ends and having a viscosity of 500 Pa·s at 25° C., 60 wt. % of branched polymethylsiloxane having a viscosity at 25° C. of 3Pa·s and represented by: $[(CH_3)_3SiO_{1/2}]_{1.38}[CH_2{=}CH(CH_3)_2SiO_{1/2}]_{0.44}(SiO_2)$, and also 100 ppm (as platinum) of a platinum catalyst, was provided, and 1390 ppm of aluminum nitrate nano-hydrate (100 ppm as aluminum) in methanol solution was blended therewith under stirring, followed by complete removal of the methanol to form a silicone rubber molding composition. Then, the above-prepared adhesive-coated aluminum cylinder was coaxially inserted about a central axis of a pipe-shaped mold, and the above prepared silicon rubber molding composition was injected into a gap between the outer surface of the cylinder and the inner surface of the mold. Then, the silicone rubber molding composition was cured on the adhesive layer 2 on the aluminum cylinder 1 at 150° C. for 30 min. to form a 1 mm-thick silicone rubber layer, thus providing a hot fixing roller 5 having an outer diameter of 60 mm.

Figure 2:
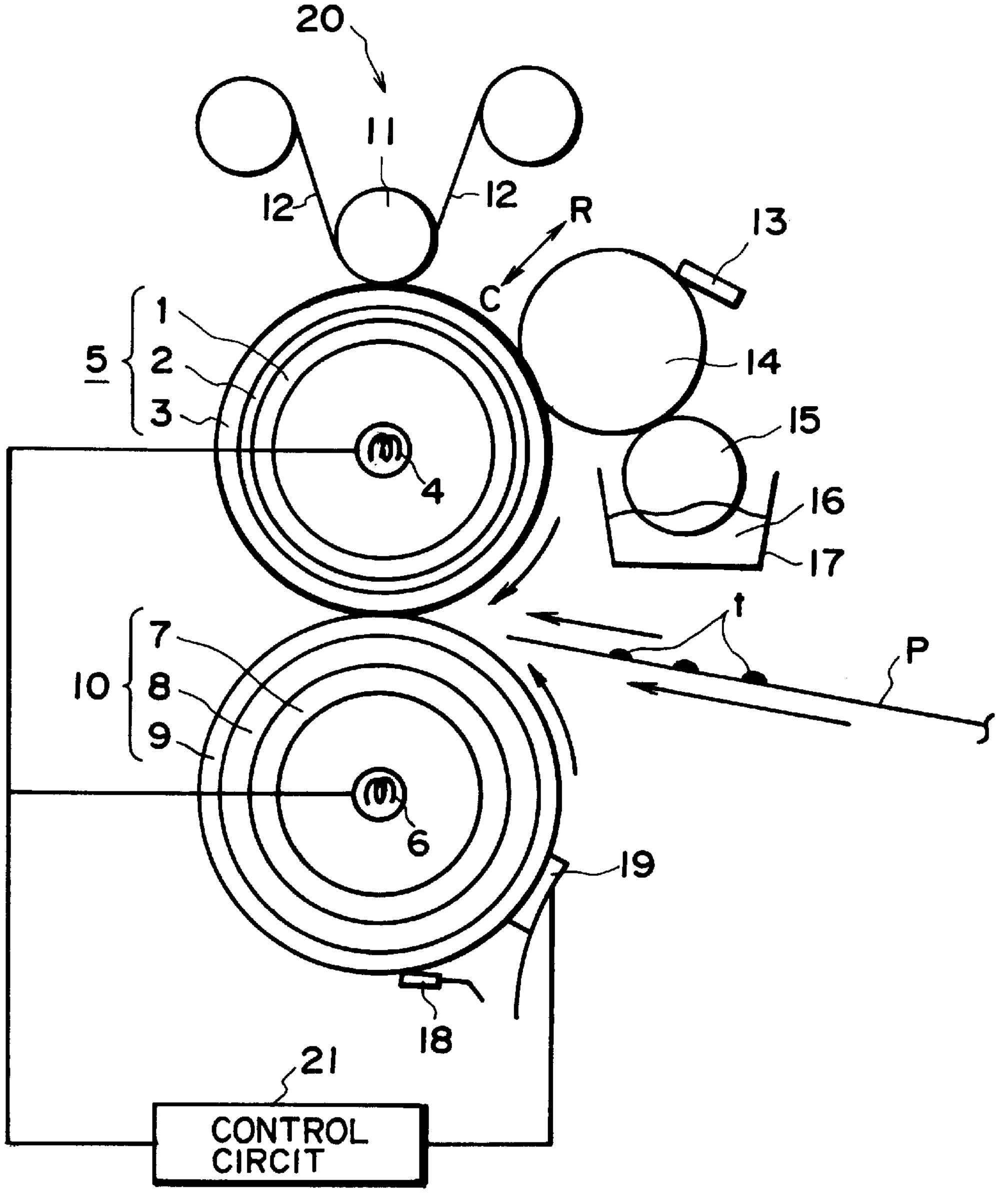
FIG. 2 is a schematic view of a fixing apparatus including such a silicone rubber-based fixing roller.

The fixing roller was further post-cured at 200° C. for 4 hours and then incorporated in a fixing apparatus having a structure as shown in FIG. 2 (for a commercially available color copying apparatus "CLC-800" (trade name), mfd. by Canon K.K.). As an explanation referring to FIG. 5, the fixing apparatus includes the fixing roller 5, a pressing roller 10, a fixing roller cleaning device 20, a pressing roller cleaning device 18, and an oil applicator 13. The pressing roller 10 has an aluminum cylinder 7 containing therein a halogen lamp heater 6 and coated with an adhesive layer 8 and a silicone rubber layer 9. The pressing roller 10 is equipped with a temperature sensor 19 so that the heaters 4 and 6 are controlled by a control circuit based on signals from the temperature sensor 19. The fixing roller 5 is cleaned by pressing a cleaning web 12 against the roller 5 by a pressing roller 11. The fixing roller is also supplied with a silicone oil 16 for offset prevention. The silicone oil 16 is contained in a vessel 17, drawn up by a roller 15 and transferred to an oil applicator roller 14 to be applied onto the fixing roller 5. To the oil applicator roller 4, an oil application adjusting blade 3 is abutted so as to adjust the oil application amount. Between the fixing roller 5 and the pressing roller 10, a paper P carrying a yet-unfixed toner image t is conveyed and nipped by the rollers, for fixation. In the absence of the paper P, between the rollers 5 and 10, the oil applicator roller 14 is released from the fixing roller 5 in a direction R.

By using the above-described fixing apparatus, a continuous copying test was performed on 20,000 sheets of paper at a set fixing temperature of 200° C. and without performing the cleaning with the cleaning web 12 so as to accelerate the deterioration. As a result, after copying on the 20,000 sheets, the silicone rubber surface layer of the fixing roller 5 was abraded by 2.5 μm, and no adverse effect on the images, or offset phenomenon was observed.

EXAMPLE 2

A heat-fixing roller was prepared in the same manner as in Example 1 except for using a silicone rubber molding composition formed by blending under stirring 580 ppm of scandium chloride hexahydrate (100 ppm as scandium) in ethanol solution with the same silicone rubber composition as used in Example 1. The fixing roller was incorporated in an identical color-copying machine ("CLC–800", mfd. by Canon K.K.) and evaluated by a continuous copying test under the same conditions as in Example 1. As a result, after copying on 20,000 sheets, the silicone rubber surface layer of the fixing roller caused an abrasion of 2.0 μm, and no adverse effect on the image or toner offset phenomenon was observed.

EXAMPLE 3

A heat-fixing roller was prepared in the same manner as in Example 1 except for using a silicone rubber molding composition formed by blending under stirring 830 ppm of chromium octanoate (100 ppm as chromium) in isopropanol solution with the same silicone rubber composition as used in Example 1. The fixing roller was incorporated in an identical color-copying machine and evaluated by a continuous copying test under the same conditions as in Example 1. As a result, after copying on 20,000 sheets, the silicone rubber surface layer of the fixing roller caused an abrasion of 1.4 μm, and no adverse effect on the image or toner offset phenomenon was observed.

EXAMPLE 4

A heat-fixing roller was prepared in the same manner as in Example 1 except for using a silicone rubber molding composition formed by blending under stirring 1030 ppm of ferrous sulfate hydrate (100 ppm as iron) in methanol solution with the same silicone rubber composition as used in Example 1. The fixing roller was incorporated in an identical color-copying machine and evaluated by a continuous copying test under the same conditions as in Example 1. As a result, after copying on 20,000 sheets, the silicone rubber surface layer of the fixing roller caused an abrasion of 1.1 μm, and no adverse effect on the image or toner offset phenomenon was observed.

EXAMPLE 5

A heat-fixing roller was prepared in the same manner as in Example 1 except for using a silicone rubber molding composition formed by blending under stirring 424 ppm of cobalt acetate (100 ppm as cobalt) in ethanol solution with the same silicone rubber composition as used in Example 1. The fixing roller was incorporated in an identical color-copying machine and evaluated by a continuous copying test under the same conditions as in Example 1. As a result, after copying on 20,000 sheets, the silicone rubber surface layer of the fixing roller caused an abrasion of 0.8 μm, and no adverse effect on the image or toner offset phenomenon was observed.

EXAMPLE 6

A heat-fixing roller was prepared in the same manner as in Example 1 except for using a silicone rubber molding composition formed by blending under stirring 924 ppm of nickel chloride-bis-diphenylphosphinopropane (available from Tokyo Kasei K.K.) (100 ppm as nickel) in methanol solution with the same silicone rubber composition as used in Example 1. The fixing roller was incorporated in an identical color-copying machine and evaluated by a continuous copying test under the same conditions as in Example 1. As a result, after copying on 20,000 sheets, the silicone rubber surface layer of the fixing roller caused an abrasion of 0.5 μm, and no adverse effect on the image or toner offset phenomenon was observed.

EXAMPLE 7

A heat-fixing roller was prepared in the same manner as in Example 1 except for using a silicone rubber molding composition formed by blending under stirring 481 ppm of copper benzoate (100 ppm as copper) in ethanol solution with the same silicone rubber composition as used in Example 1. The fixing roller was incorporated in an identical color-copying machine and evaluated by a continuous copying test under the same conditions as in Example 1. As a result, after copying on 20,000 sheets, the silicone rubber surface layer of the fixing roller caused an abrasion of 0.5 μm, and no adverse effect on the image or toner offset phenomenon was observed.

EXAMPLE 8

A heat-fixing roller was prepared in the same manner as in Example 1 except for using a silicone rubber molding composition formed by blending under stirring 961 ppm of zinc oleate (100 ppm as zinc) in isopropanol solution with the same silicone rubber composition as used in Example 1. The fixing roller was incorporated in an identical color-copying machine and evaluated by a continuous copying test under the same conditions as in Example 1. As a result, after copying on 20,000 sheets, the silicone rubber surface layer of the fixing roller caused an abrasion of 0.5 μm, and no adverse effect on the image or toner offset phenomenon was observed.

Comparative Example 1

A heat-fixing roller was prepared in the same manner as in Example 1 except for using a silicone rubber molding composition consisting of only the same silicone rubber composition as used in Example 1 and containing no aluminum nitrate nanohydrate. The fixing roller was incorporated in an identical color-copying machine and evaluated by a continuous copying test under the same conditions as in Example 1. As a result, after copying on 20,000 sheets, the silicone rubber surface layer of the fixing roller caused an abrasion of 12 μm. Further, adverse effect due to scars appeared on the images and toner offset phenomenon was partially observed.

Comparative Example 2

A heat-fixing roller was prepared in the same manner as in Example 1 except for using a silicone rubber molding composition formed by blending under stirring 190 ppm of palladium sulfate (100 ppm as palladium) in methanol solution with the same silicone rubber composition as used in Example 1. The fixing roller was incorporated in an identical color-copying machine and evaluated by a continuous copying test under the same conditions as in Example 1. As a result, after copying on 20,000 sheets, the silicone rubber surface layer of the fixing roller caused an abrasion of 8 μm. Further, adverse effect due to scars appeared on the images and toner offset phenomenon was partially observed.

Comparative Example 3

A heat-fixing roller was prepared in the same manner as in Example 1 except for using a silicone rubber molding composition formed by blending under stirring 642 ppm (0.0642 wt. %) of powdery silica gel ("R–972", available from Nippon Aerosil K.K.) (300 ppm as Si) in ethanol solution with the same silicone rubber composition as used in Example 1. The fixing roller was incorporated in an identical color-copying machine and evaluated by a continuous copying test under the same conditions as in Example 1. As a result, after copying on 20,000 sheets, the silicone rubber surface layer of the fixing roller caused an abrasion of 12 μm. Further, adverse effect due to scars appeared on the image and toner offset phenomenon was partially observed.

EXAMPLE 9

A silicone rubber composition containing 35 wt. % of a linear polydimethylsiloxane terminated with vinyl groups at both ends and having a viscosity at 25° C. of 700 Pa·s, 65 wt. % of the branched polymethylsiloxane used in Example 1 and 100 ppm (as platinum) of a platinum catalyst, was provided, and 486 ppm of ferric chloride hexa-hydrate (100 ppm as iron) in methanol solution was blended therewith under stirring to form a silicone rubber molding composition.

A heat-fixing roller was prepared by using the silicone rubber molding composition otherwise in the same manner as in Example 1, and evaluated by a continuous copying test in a color-copying apparatus under the same conditions as in Example 1. As a result, after copying on 20,000 sheets, the silicone rubber surface layer of the fixing roller caused in abrasion of 0.4 μm, and no adverse effect on the images or toner offset phenomenon was observed.

Alternatively, silicone rubber fixing rollers were prepared in the same manner as above but using 972 ppm, 242 ppm and 24 ppm, respectively, of ferric chloride hexahydrate (200 ppm, 50 ppm and 5 ppm, respectively, as iron) instead of the 486 ppm of ferric chloride hexahydrate (100 ppm as iron) in the silicon rubber molding composition. As a result of continuous copying on 20,000 sheets in the same manner, the resultant fixing rollers exhibited abrasions of 0.3 μm, 2.5 μm and 5 μm, respectively.

EXAMPLE 10

A silicone rubber composition containing 20 wt. % of a linear polydimethylsiloxane terminated with vinyl groups at both ends and having a viscosity at 25° C. of 1000 Pa·s. 80 wt. % of the branched polymethylsiloxane used in Example 1 and 100 ppm (as platinum) of a platinum catalyst, was provided, and 895 ppm of aluminum chloride hexa-hydrate (100 ppm as aluminum) in methanol solution was blended therewith under stirring to form a silicone rubber molding composition.

A heat-fixing roller was prepared by using the silicone rubber molding composition otherwise in the same manner as in Example 1, and evaluated by a continuous copying test in a color-copying apparatus under the same conditions as in Example 1. As a result, after copying on 20,000 sheets, the silicone rubber surface layer of the fixing roller caused in abrasion of 0.6 μm, and no adverse effect on the images or toner offset phenomenon was observed.

Alternatively, silicone rubber fixing rollers were prepared in the same manner as above but using 1790 ppm, 448 ppm and 45 ppm, respectively, of aluminum chloride hexahydrate (200 ppm, 50 ppm and 5 ppm, respectively, as aluminum) instead of the 895 ppm of aluminum chloride hexahydrate (100 ppm as aluminum) in the silicon rubber molding composition. As a result of continuous copying on 20,000 sheets in the same manner, the resultant fixing rollers exhibited abrasions of 0.5 μm, 2.8 μm and 6 μm, respectively.

The above-mentioned worn thicknesses of the silicone rubber surface layer of the fixing rollers prepared in Examples and Comparative Examples are summarized in the following Table 1. In view of the above-described results together with Table 1, it is believed clear that the silicone rubber-surfaced fixing roller according to the present invention shows excellent performances as a heat-fixing roller.

TABLE 1

| Examples | Fixing roller worn thickness (μm) |
|---|---|
| Ex. 1 | 0.6 |
| Ex. 2 | 3.2 |
| Ex. 3 | 2.8 |
| Ex. 4 | 0.5 |
| Ex. 5 | 3.0 |
| Ex. 6 | 0.9 |
| Ex. 7 | 0.9 |
| Ex. 8 | 0.9 |
| Ex. 9 | 0.3 |
| Ex. 10 | 0.5 |
| Comp. Ex. 1 | 12 |
| Comp. Ex. 2 | 8 |
| Comp. Ex. 3 | 12 |

What is claimed is:

1. A fixing member having a surface layer comprising a silicone rubber layer containing a metal compound selected from the group consisting of aluminum nitrate, ferrous sulfate, ferric chloride and aluminum chloride.

2. A fixing member according to claim 1, wherein the silicone rubber layers contains the metal compound at 3–300 ppm in terms of a metal content.

3. A fixing member according to claim 1, wherein the silicone rubber layer comprises a silicone rubber containing at least 20 wt. % of polymerized units of a linear polysiloxane having a vinyl group at both terminals and a viscosity of at least 400 Pa·s at 25° C.

4. A fixing member according to claim 3, wherein said linear polysiloxane having a vinyl group at both terminals comprises at least one member selected from polydialkylsiloxanes, polydiarylsiloxanes and polyalkylarylsiloxanes.

5. A fixing member according to claim 1, wherein said silicone rubber layer comprises a silicone rubber formed by addition polymerization in the presence of a platinum catalyst.

6. A fixing member according to claim 1, wherein the surface layer is disposed on a roller-shaped member.

7. A fixing apparatus, comprising a fixing roller and a pressing member for conveying therebetween a recording material carrying a yet-unfixed toner image thereon to fix the toner image onto the recording material; said fixing roller having a surface layer comprising a silicone rubber layer containing a metal compound selected from the group consisting of aluminum nitrate, ferrous sulfate, ferric chloride and aluminum chloride.

8. A fixing apparatus according to claim 7, wherein the silicone rubber layers contains the metal compound at 3–300 ppm in terms of a metal content.

9. A fixing apparatus according to claim 7, wherein said silicone rubber layer comprises a silicone rubber formed by addition polymerization in the presence of a platinum catalyst.

* * * * *

UNITED STATES PATENT AND TRADEMARK OFFICE

CERTIFICATE OF CORRECTION

PATENT NO. : 5,863,660

DATED : January 26, 1999

INVENTOR(S) : HIROAKI KUMAGAI, ET AL.

It is certified that error appears in the above-identified patent and that said Letters Patent is hereby corrected as shown below:

FIGURE 2,
"CONTROL CIRCIT" should read --CONTROL CIRCUIT--.

COLUMN 3,
Line 7, "sub-strated" should read --sub-strate--.

COLUMN 8,
Line 46, "layers contains" should read --layer contains--.

Signed and Sealed this

Thirty-first Day of August, 1999

Attest:

Q. TODD DICKINSON

*Attesting Officer*

*Acting Commissioner of Patents and Trademarks*